Aug. 19, 1952    L. P. MOREY    2,607,588
WEB CENTERING DEVICE
Filed July 9, 1948    5 Sheets-Sheet 2

LEON P. MOREY
INVENTOR
BY
ATTORNEYS

Aug. 19, 1952      L. P. MOREY      2,607,588

WEB CENTERING DEVICE

Filed July 9, 1948      5 Sheets-Sheet 3

LEON P. MOREY
INVENTOR

BY
ATTORNEYS

Aug. 19, 1952  L. P. MOREY  2,607,588
WEB CENTERING DEVICE
Filed July 9, 1948  5 Sheets-Sheet 4

LEON P. MOREY
INVENTOR
BY
ATTORNEYS

Patented Aug. 19, 1952

2,607,588

UNITED STATES PATENT OFFICE 2,607,588

WEB CENTERING DEVICE

Leon P. Morey, Rochester, N. Y., assignor to Eastman Kodak Company, Rochester, N. Y., a corporation of New Jersey Application July 9, 1948, Serial No. 37,923

18 Claims. (Cl. 271—2.6)

The present invention relates to a web handling apparatus and more particularly to a web centering or steering device.

This device has been designed primarily for centering a web, such as a web of photographic film base, as the latter is being moved to a coating apparatus, and is adapted to correct the wandering of the web from the center line of the machine and to recenter the web relative thereto. Experience indicates that by the time the film has reached the coating apparatus, it may have drifted from one to two inches in either direction away from the center line of the machine. Yet, it is necessary when the web reaches the coating roll that the film should be within $\frac{1}{16}$ of an inch of the center line in order to maintain the margins customary in hopper coating. In order to deliver the film web to the coating roll on the center line of the machine, the film or web centering device of the present invention was developed.

The usual method of web centering is to tilt one or more rolls contacting the web so that the web is stressed at only one edge to cause it to return with more or less accuracy to a centered position at some point in its travel perhaps several feet from the control point where the roll was tilted. Such a method is characterized by constant hunting, a wide increment of drift, and somewhat indefinite centering control.

In the centering device of the present invention, on the other hand, the detection of side drift and the complete correction for drift occur at substantially the same location on the web. The result is that a fine increment of control has been obtained. The present centering device comprises broadly, a rigid hollow rectangular frame which is pivoted for lateral planar movement. In the present embodiment, this frame is shown arranged in a vertical position, but this is merely by way of illustration as it is evident that the frame may be arranged horizontally, inclined, or in any other suitable position and still function to center the web of film as will be hereinafter described. The frame carries a pair of vertically aligned guide rollers over which the film moves. The film is fed to and from the frame by a pair of vertically aligned fixed rollers which are in substantial horizontal alignment with the rollers of the frame so that the portions of the web passing to and from the frame are in parallel planes and normal to the plane of the rollers on the frame. Thus, the web passes through a 90-degree angle when directed to and from the frame member. Drive means is connected to the frame to tilt the latter about a pivot to vary the relationship of the frame to the web to recenter the latter relative to the machine. A spring-pressed pad engages a marginal edge of the web and moves laterally therewith. This pad is located at the closest practical point on the lateral edge of the webs preceding the leaving roll of the frame, and controls the drive means so that the frame will be pivoted or tilted in the proper direction and in the proper amount to recenter the web as it leaves the frame. As the frame is pivoted, the latter, with its pivot, is moved vertically so that in all tilted positions of the frame, the center line of the web being fed to the frame will always be in the same plane, for a reason to be later described. When the web is exhausted, a second feeler pad, which engages the opposite edge of the web, is actuated to disconnect automatically the first pad from the circuit of the drive motor and to connect the second pad in to the motor circuit to return the frame to its centered position so that the frame will be centered at the start of the next operation. When the frame reaches the center position, the circuit controlled by the second pad is opened to retain the frame in its center position.

The invention has as its principal object the provision of a device for centering a moving web.

A still further object of the invention is the provision of a web centering device which does not impart unequal tensions in the web edges during centering.

And another object of the invention is the provision of a web centering device which maintains a moving web in a fixed central position within a few inches of the point where any lateral drifting of the web is detected.

A further object of the invention is the provision of a web centering device in which the detection of side drift of the web and the complete connection therefor occur at substantially the same location on the web.

Yet another object of the invention is the provision of an arrangement by which the rate of adjustment of the centering mechanism is within a predetermined percentage of the lineal speed of the web to prevent the formation of wrinkles therein.

Another object of the invention is the provisions of a web centering device which is automatic, positive, accurate and highly effective in use.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

The centering or steering device of the present invention comprises a moving roll frame, a drive for the moving roll frame, operating controls for the steering of film, and mechanisms for centering the moving roll frame. This device is primarily designed for centering a web of photographic film web 20 of substantial width, such, for example, 50 inches, so as to deliver the web in a centered relation to a coating roller 21. As the coating structure does not constitute a part of the present invention, details thereof are not described or illustrated.

Figures 1, 2:
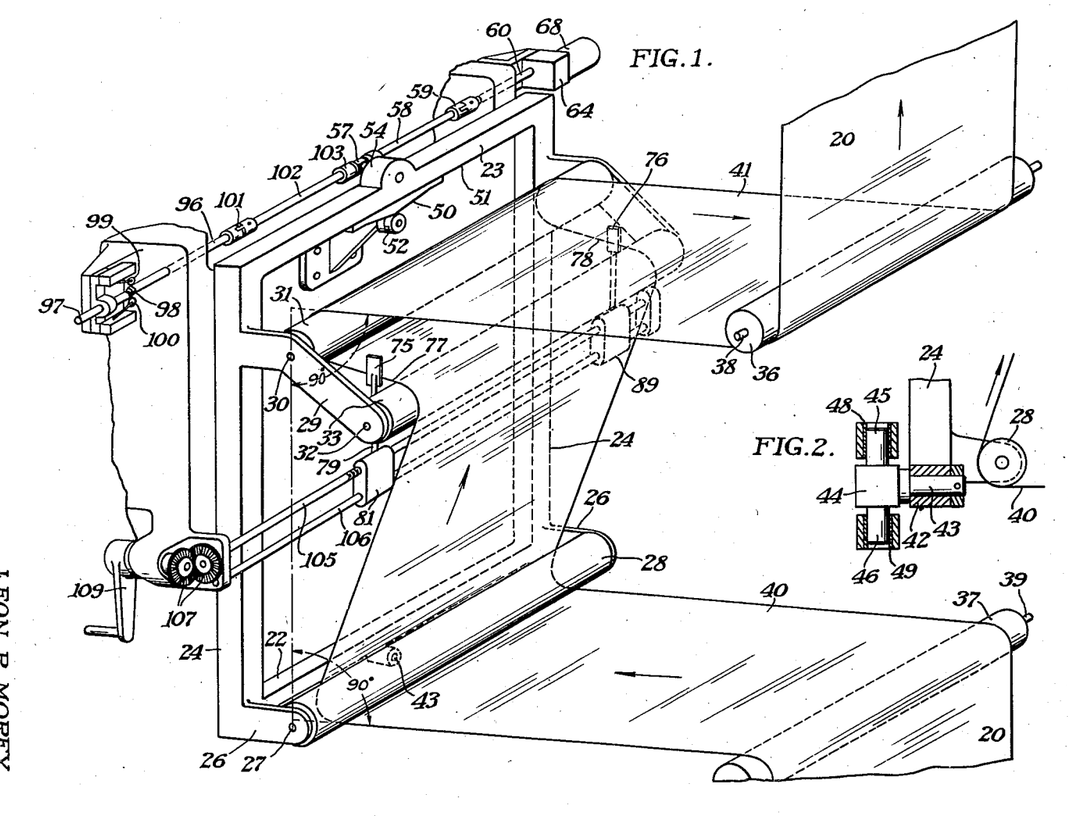
Fig. 1 is a rear diagrammatic perspective view of one form of web centering device constructed in accordance with the present invention, showing the relation of the various parts of the movable frame.
Fig. 2 is a vertical sectional view through the adjustable pivot for the web centering frame.
Figure 3:
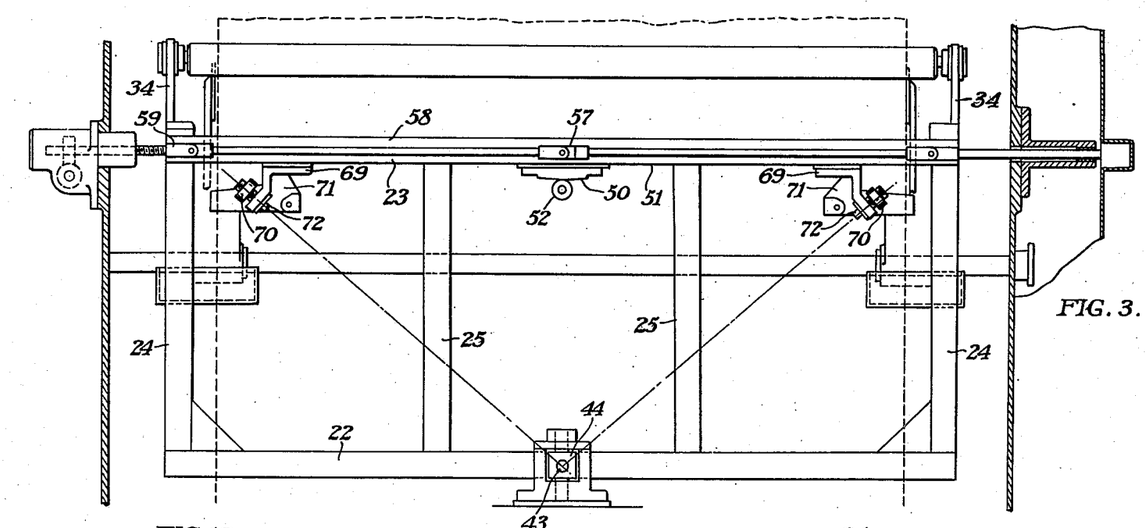
Fig. 3 is a front elevation view of another form of centering frame adapted for use with a wider web than the frame illustrated in Fig. 1, showing the operating parts.
Figures 4, 5:
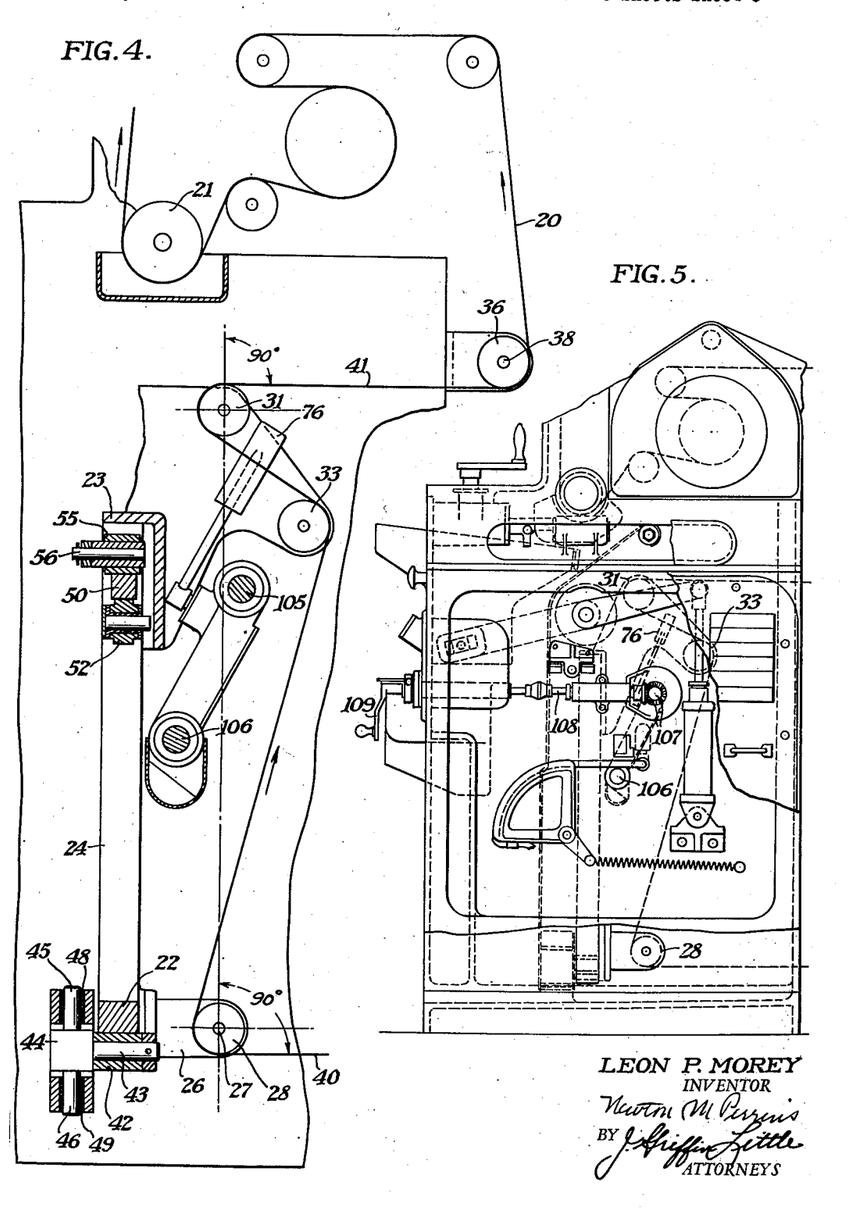
Fig. 4 is a side view of the frame mechanism illustrated in Fig. 3, with parts in section, showing the relation thereto to the coating apparatus or roller.
Fig. 5 is an external side elevation view of the housing for the movable centering frame and the coating apparatus, showing the various controls.

The moving section consists of a rigid rectangular frame which, in the preferred construction, is made from square metal tubes to provide a bottom 22, a top 23, and opposite sides 24, as shown in Figs. 1 and 3. The structure of Fig. 1 is intended for narrow webs while that of Fig. 3 is for wider webs, such as webs up to 50 inches in width. When such wide webs are handled, obviously, the frame must be wider, and the wider frame preferably is reinforced by one or more vertical intermediate supports 25 positioned uniformly between the sides 24, as shown in Fig. 3. Thus, a rigid supporting frame is provided. The lower ends of the sides 24 have secured thereto or formed integral therewith, a pair of rearwardly extending arms 26 in which is journaled the axis 27 of a lower idler roller 28, the axis 27 being parallel to the bottom 22. In the arrangement in Fig. 1, the sides 24, adjacent to top thereof, have projecting rearwardly therefrom a pair of arms 29 which support the axis 30 of the upper idler roller 31, the axis 30 being parallel to the bottom 22 and the axis 27, and in vertical alignment with the latter. Thus the rollers 28 and 31 are in vertical alignment and parallel. The arms 29 extend beyond the roller 31 and support the axis 32 of an intermediate roller 33 which is positioned slightly below but parallel to the roler 28. In the arrangement in Fig. 3, the upper and intermediate rollers 31 and 33 are positioned above the top 23 and are carried by arms 34. Thus, in both arrangements, the three rollers form a triangle on the rear side of the supporting frame, the axes of the rollers being parallel and the rollers 28 and 31 being in vertical alignment, as best shown in Fig. 4. If necessary or desirable, additional reinforcing members may be added to the frame to strengthen the latter to insure the rigidity thereof.

An upper and a lower roller 36 and 37 respectively are mounted on the machine frame, not shown, independent of rollers 28 and 31. These rollers 36 and 37 have their axes 38 and 39 in vertical alignment and parallel to each other and to the vertical plane through the axes 27 and 30 of the rollers 28 and 31, as best shown in Fig. 1. Thus, the rollers 28, 31, 36 and 37 are parallel when the movable frame is in central position. The lower roller 37 is positioned with its top in horizontal alignment with the bottom of the roller 28, while the bottom of the roller 36 is in horizontal alignment with the top of the roller 31. The result is that when the film strip 20 is directed to and from the frame, the central axes of portions 40 and 41 of the web will be in parallel planes which are normal to the vertical plane passing through the axes of rollers 28 and 31, as best shown in Figs. 1 and 4. All the above-described rollers are idlers and are rotated solely by the web moving thereover. As the moving means for the web forms no part of the present invention it is not shown or described, but any suitable or well-known drive means may be provided.

The rectangular frames of Figs. 1 and 4 are mounted so as to be movable or tiltable only in a single plane which is always parallel to the vertical plane through the fixed rollers 36 and 37 so that the plane including the axes of rollers 28 and 31 will always remain parallel to the plane including the axes of rollers 36 and 37. To secure this result, the bottom 22 of the frame at its mid-point is provided with a steel sleeve 42 in which is positioned a horizontally extending pin or trunnion 43 formed on and projecting from a square block 44 which is also provided with vertically extending trunnions 45 and 46, vertically movable in bearings 47 and 48 positioned on the opposite side of the frame from the rollers 28 and 31 and 33 and carried by the machine frame. Thus, the frame may pivot or tilt about trunnion 43, and the frame, with its pivot 43, may move vertically, by reason of the trunnions 45 and 46, as best shown in Fig. 2. By means of this construction, the pivot 43, which is located at the center of the bottom 22, is free to move up and down vertically a small distance, for a purpose to be later described.

The vertical position of the frame, with its vertically movable pivot 43, is determined by means of a V-shaped cam 50 secured to the underside 51 of the top 23 and supported on a fixed roller 52 positioned in vertical alignment with the pivot trunnion 43 and mounted in any suitable manner on the main machine frame. It will now be apparent, that if the frame is moved or tilted laterally on the trunnion 43 by a mechanism to be later described, the cam 50 will move over the fixed roller 52. As the cam is provided with a surface which tapers upwardly from its midpoint, as shown in Figs. 1 and 3, such tilting will cause the frame to move vertically downwardly, such movement being permitted by the bearings 48 and 49. Thus, the frame tilts, and simultaneously shifts vertically downwardly a slight amount.

At the center of the top 23, in vertical alignment with the roller 52 and pivot 42, a boss 54, Fig. 1, and a sleeve 55, Fig. 4, are provided through which a pin 56 projects. This pin extends in front of the frame and has mounted thereon a rod 57 which is connected through a rod 58 and universal joints 59 to a rod 60, the right end of which is threaded at 61 to engage a threaded sleeve 62 of a gear 63 mounted in a gear box 64. The latter has also positioned therein a gear 65 which meshes with gear 63 and is mounted on a shaft 66 which is connected through a coupling 67 to the drive motor 68. It will now be apparent that when the motor is energized, the gears 63 and 65 will turn to rotate rod 57 which, acting through pin 56, will impart a sideways movement or tilt to the frame with its rollers 28, 31 and 33. The direction of tilt depends, of course, on the direction of the rotation of the motor and the parts driven thereby.

In narrow frames such as shown in Fig. 1, the pin 56 and the pivot 43 may be sufficient to retain the frame in a plane during the tilting and vertical movements. However, especially in wider frames such as shown in Fig. 3, it is desirable to provide additional means to retain the frame in a plane. To this end, the frame of Fig. 3 has secured to the underside 51 of the top 23 adjacent sides 24 a pair of brackets 69 spaced equi-distance on opposite sides of the vertical center line through pivot 43 and roller 52. The outer end of each bracket has mounted therein a pair of ball bearings 70 positioned to engage opposite sides of a plate 71 firmly supported in fixed position on the machine frame. This plate is parallel to the frame and the rollers 28, 31 and 33. Each bearing is carried by a shaft 72, the axis of which intersects the axis of the pivot 43, as shown in Fig. 3. To facilitate positioning and adjustment of the ball bearings, the shafts 72 are mounted in eccentric bearings which, after adjustment, are locked in position. These two ball bearings together with pivot 43 form a very accurate and rigid three-point support which assures positively the planar movement of the frame during the tilting and vertical movements. The only allowable motion is a rotation of about three and one-half degrees about the pivot 43, combined with a slight vertical movement of the pivot itself, by reason of the cam 50.

Figures 6, 8:
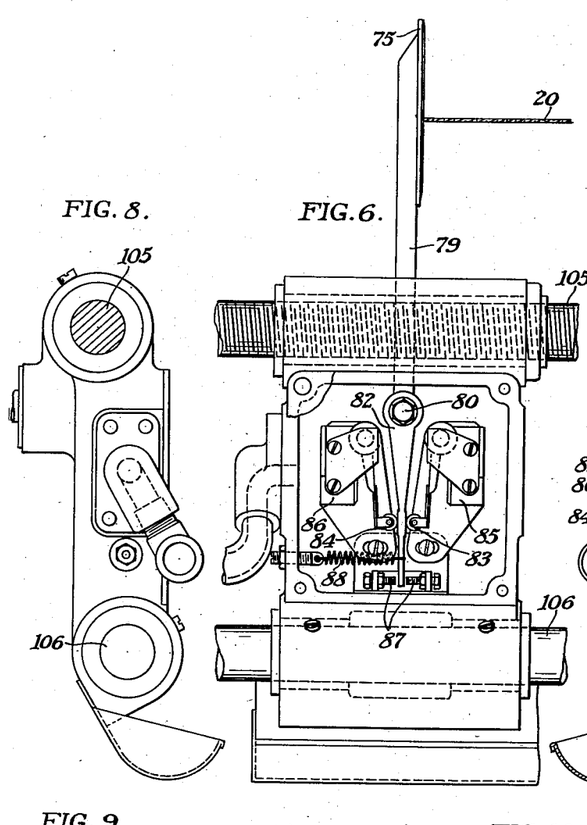
Fig. 6 is a front view of the web-engaging feeler-pad housing with the cover plate removed, showing the mechanism for adjusting the pad and the relation to the switches which are controlled by the pad movement.
Fig. 8 is a partial left side elevation view of the structure illustrated in Figs. 6 and 7.
Figure 7:
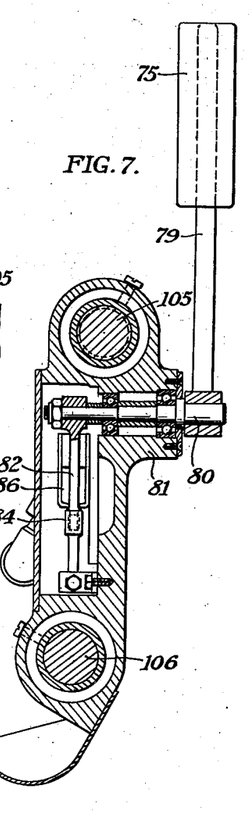
Fig. 7 is a vertical sectional through the housing of the pad support, illustrated in Fig. 6, showing the mounting for the pad.
Figure 9:
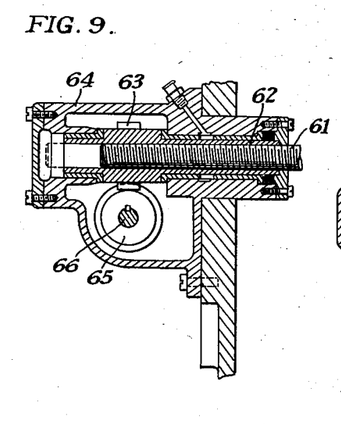
Fig. 9 is a vertical longitudinal sectional view through the gear housing, showing the arrangement for connecting the motor to the frame moving means.
Figure 10:
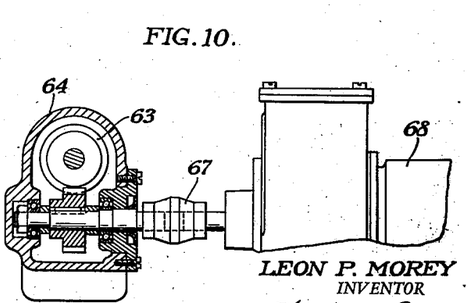
Fig. 10 is a side elevation view of the drive motor and the gear box illustrated in Fig. 9 with the latter in section, showing the means for transmitting the rotation of the gears to a longitudinal or axial movement of the shaft or rod connected to the frame member to tilt the latter.

In operation, the web 20, with a wrap of at least 90 degrees on the lower fixed roller 37 passes to the bottom side of the lower roller 28 on the movable frame. The web may then pass directly to the upper roller 31, but it is preferred to direct the web to the intermediate roller 33 and then to roller 31 to provide a short relatively stiff section extending between a pair of spring-pressed follower blades or pads 75 and 76 adapted to engage opposite sides or marginal edges 77 and 78 respectively of the web adjacent roller 31. The web is then wrapped around the upper roller 31 with approximately 120 degrees wrap and finally under and around the upper fixed roller 36 from which it passes over idle rollers to coating roller 21. As the web 20 approaches fixed roller 37 it may be off-center. The mechanism is designed for a maximum sideward drift of two inches either way from the center line, or a total of four inches. When a given point in the web reaches a feeler pad 75, the pad follows the web, as will be later described, the direction of the movement depending of course on the direction of off-centering of the web. This movement of the pad closes a switch in the circuit of the motor 68 to energize the latter to tilt the frame in the proper direction. To secure this result, the pad 75 is carried by the upper end of an arm 79, the lower end of which is secured to one end of a rock shaft 80 supported in a housing 81. The other end of the shaft 80 has secured thereto a depending arm 82 which extends downwardly between a pair of rollers 83 and 84 of a pair of microswitches 85 and 86, as shown in Fig. 6. The arm 82 extends below the rollers 83 and 84 and terminates between a pair of adjustable stop screws 87 which limit the movement of the arm 82 and hence the pad 75. A spring 88 has one end anchored to the housing 81 and the other end attached to the arm 82 to hold pad 75 yieldably in contact with the edge 77 of the edge 20, as clearly shown in Fig. 6.

Assume now that the entering web 20 has drifted to the left or towards pad 75, Fig. 1. The pad is then pushed outwardly or to the left as viewed in Fig. 1. Such movement will turn rock shaft 80 in a counter-clockwise direction, as viewed in Fig. 6, to turn arm 82 similarly to move the latter into engagement with the roller 83 to close the microswitch 85. The closing of this switch, through a circuit to be later described, energizes the motor 68 to cause the latter to rotate in such a direction as to tilt the frame to the right or in a clockwise direction about the pivot 43. Such tilting will cause the web to creep gradually back to the right, the pad 75 following the web 20, by reason of the spring 88. When the web has been returned to its center position, the arm 82 has been moved sufficiently to open switch 85 and the motor stops. If, however, the web is off-center to the right, Fig. 1, the pad 75 will follow the web and move to the right. Such movement will shift arm 82 to the left, Fig. 6, to close switch 86 to energize motor 68 in a manner to shift the frame to the left or in a counter-clockwise direction. When the web is again recentered, switch 86 is opened and the motor stops. This tilting of the frame causes the web 20 to leave the roller 31 with its center line always lying in a plane perpendicular to the fixed rollers 36 and 37 and passing through the center of roller 36. Thus, the web is always discharged in a centered relation irrespective of its off-centering when directed to the tilting frame.

It will be apparent that if the web 20 being fed to the lower roller 28 is off-center, the frame will be tilted to correct this condition. Such tilting will, however, tilt roller 28 and thus move the center line of the web upwardly and above the plane formed by the top of the roller 37 and the bottom of the roller 28 when the latter is in its center position. It is necessary that the center line of the web as it reaches the bottom roller 28 should always be perpendicular to the vertical plane through rollers 28 and 31. In order to maintain this condition when the movable frame tilts, the cam 50 causes the frame and the pivot 43 to move vertically downwardly in an amount sufficient to keep the center line of the incoming web 20, rather than the center line of the roller 28, perpendicular to rollers 28 and 31. This is necessary so that the tension generated in both edges 77 and 78 of the web are the same since the axis about which the incoming web is turned is always in the center of the web. By maintaining this condition, the possibility of any slippage or skidding of the material is largely eliminated.

While the operation of this mechanism is obviously intermittent; that is, the web moves a certain distance away from the center and is brought back to the center, nevertheless, these increments are so small, being approximately 0.010 of an inch, the operation is practically continuous and instantaneous and the web is maintained in the center position within the limits of the machine.

Near the right edge 78 of the web 20 is positioned a housing 89 which carries a pad or blade 76. This housing construction is identical to 81 above described except that only a single microswitch is positioned therein. This unit is adjusted against the edge 78 of the web 20 similar to pad 75, but its purpose is entirely different. When the end of the web passes pad 76, the latter moves inwardly or to the left, as viewed in Fig. 1, under the action of its spring to close switch 90 which is carried in housing 89. The closing of the latter automatically cuts out control switches 85 and 86, and transfers the centering operation to the centering switch 90, as will be described later in connection with the wiring diagram.

Figure 11:
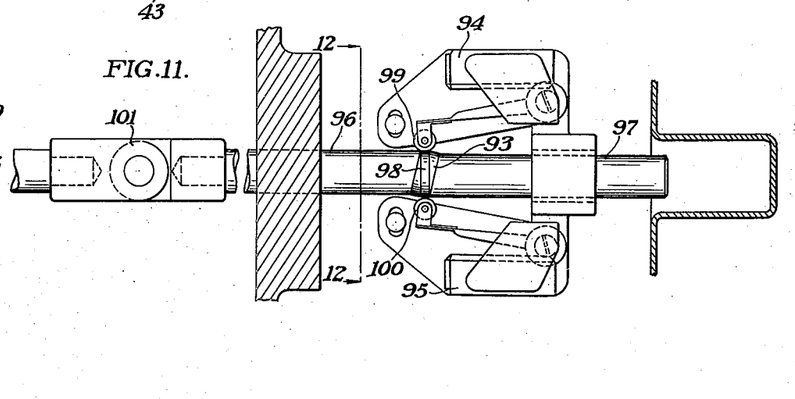
Fig. 11 is a side elevation view of the mechanism for centering the frame member.
Figure 12:
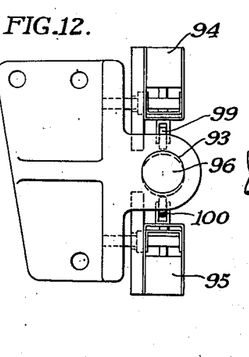
Fig. 12 is an end view of the cam switches shown in Fig. 11 and taken substantially on line 12—12 thereof.

The mechanism accomplishing this centering operation is very simple and consists merely of a double-acting cam 93 which operates two microswitches 94 and 95, which, in turn, control motor 68 in either its forward or reverse direction, depending on the direction of the frame as has been previously tilted. This unit is located at the opposite side of the frame from motor 68, see Fig. 1. The cam, which consists of two off-centered rods 96 and 97, is connected so that one side of one rod is flush with one edge of a disc 98 and the other side is flush with the other edge of the disc as clearly illustrated in Fig. 11. It will now be apparent from an inspection of this figure that if the rods are moved to the left, the roller 99 of the switch 94 will move downwardly to close switch 94. A rightward movement of the rod will, on the other hand, cause roller 100 of the switch 95, to move upwardly to close switch 95. When, however, both rollers engage the periphery of the disc 98, both switches 94 and 95 are opened. The rods are mounted in suitable bearings to permit axial movement in a manner and for a purpose to be described presently.

The rod 96 is connected through a universal joint 101 and rod 102 which, in turn, is connected through a second universal joint 103 to the rod 57, see Fig. 1, so that when the motor 68 is energized to rotate rod 60 to tilt the frame, the cam 93 will be moved to the right or left depending on the direction of the rotation of the rod by the motor. If the frame is tilted to the left, the rods 96 and 97 will be shifted to the left, as viewed in Fig. 1, or to the right as viewed in Fig. 11. This movement will close switch 95 to rotate the rod 60 to tilt the frame to the right, Fig. 1, and back to its center position. If, on the other hand, the frame is tilted to the right, the switch 94 will be closed to rotate motor 68 in the opposite direction to return the frame to its center position. Thus, irrespective of the direction of tilt of the frame when the web is exhausted, the pad 76 will close the proper switch 94 or 95 to return the frame to its center position. Thus, by means of pad 75 and the switches controlled thereby, a tilt is imparted to the frame to recenter the off-centered sheet as it leaves the frame. Also, this frame, by means of pad 76 and the switches controlled thereby, is returned automatically to its centered position when the web is exhausted or is torn so as not to support pad 76. Thus, the frame is always in its centered position when the web is started through the machine.

It has been found that if the rate of tilt of the movable frame exceeds a certain percentage of the speed of the material or web, there is not sufficient time for the web to adjust itself by creeping on the fixed roller 36. In such an event, a diagonal wrinkle will be formed in the web between the rollers 31 and 36 with damage to the web. It has been found that with a film web, such as photographic film base, that a safe proportion is a tilting speed equal to one-half of one per cent of the lineal speed of the web. This figure varies with the distance between rollers 31 and 36 and with the width of the web. One of the important applications of this type of mechanism is a machine where the web of material is passing through with a rather high tension, such as two pounds per inch of web width, and where the material is rather stiff and firm, where the machine is rather wide, say 50 or more inches and finally where the web is highly sensitive to abrasion.

In order that the pads 75 and 76 may be positioned to engage the opposite edges 77 and 78 of the web 20, they are mounted for adjustment toward or away from each other so as to be adapted for use with webs of different widths. To secure this result, an upper rod 105 and a lower rod 106 are suitably supported in the machine frame and pass through openings formed in the housings 81 and 89 to support and guide the housings. The upper rod 105 is provided with right and left-hand threads so connected to the housings that by rotating the rod the housings, and hence the pads 75 and 76, may be moved toward and away from each other to engage the web edges. A gear train 107 is connected to one end of the rod 105, and, through shaft 108, is connected with an operating handle 109. The rotation of the latter in the proper direction will move the pads 75 and 76 in proper direction relative to the web to accommodate webs of different thicknesses and moves the pads into engagement therewith.

The basic purpose of the device of the present invention is to receive web material after a considerable travel from a previous operation during which time the web may have wandered laterally from the center line of the machine, and correct sidewise drift with no damage to the material so as to deliver the web to the next operation with the center line of material coincident with the center line of the machine.

Figure 13:
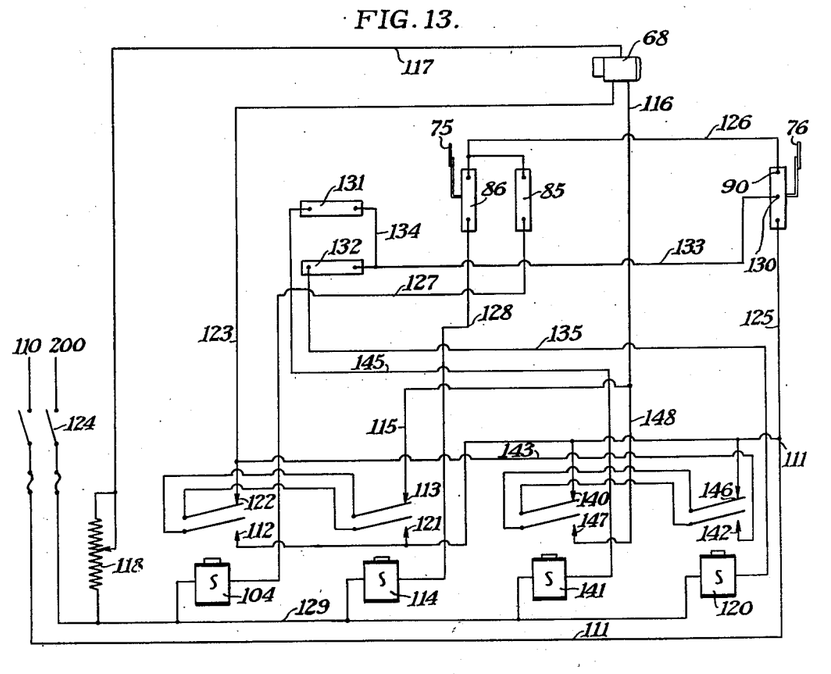
Fig. 13 is a wiring diagram of the various electrical circuits.

Having described the various structural features and the operation thereof, the different electrical circuits will now be described with relation to Fig. 13 which discloses the wiring diagram.

To illustrate the operation, it is assumed that the web 20 is off-center to the left. Pad 75 is then moved to the left, closing microswitch 85 and energizing the right control relay 104. This completes the electrical circuit to the series motor 68 as follows: from point 110 through line 111 to the normally open contact 112 on the right control relay 104 which is energized, and then through the normally closed switch 113 on the left control relay 114 which is not energized, through lines 115 and 116 to the series motor 68, and returning on wire 117, through a speed control resistor 118 back to the other side of the line 200. This will cause motor 68 to rotate in such a direction as to tilt the movable frame in a clockwise direction, as viewed in Fig. 1, bringing the web 20 back to the center. If the web of material is off-center to the right, the pad 75 moves to the right operating the microswitch 86 and energizing the left control relay 114 (now energized). This completes the circuit as follows: From point 110 to a normally opened contact 121 on the left control relay 114, from there through the normally closed contact 122 on the right control relay 104 (not energized) and from there through the line 123 to the series gear motor 68 and back through line 117, through the speed resistor 118 to the other side 200 of the line. This will energize the series motor 68 to run in the reverse direction from the previous operation and to tilt the frame counter-clockwise. During the sequence of operations just described, the pad 76 has been held to the right continuously by the web 20 of the material. The pad 76 holds the centering microswitch 90 in the closed position. The mechanism operating the switch 90 is arranged so that if there is a web in the machine, regardless of how far off-center it may be, this switch is actuated. Switch 90 closes the circuit to the previously mentioned microswitch 85 and microswitch 86 making them effective only when there is a web in the machine. This circuit is as follows: from one side of the line 110 through the tumbler disconnecting switch 124 along lines 111 and 125 to the centering microswitch 90 to line 126, from there to both microswitches 85 and 86. If the pad 75 is moved to the left by the web, microswitch 85 is operated permitting current to flow through line 127, to the coil of control relay 104 to the other side of the line. If the pad 75 is moved to the right, the microswitch 86 is actuated permitting current to flow through line 128 and from there to the coil of the control relay 114 and through line 129 to the other side of the line.

If there is no web in the film steering device, the pad 76 moves, by spring action, to the extreme left of its travel. This opens the circuit to the microswitches 85 and 86 putting them out of control. A normally closed contact 130 on the centering microswitch 90 closes the circuit to the centering limit switch right 131 and a centering limit switch left 132 through line 133 which restores the movable frame to its center position. The circuit is as follows: From one side of the line 110 through 111 and 125 to the centering microswitch 90 through the normally closed contact 130 to line 133, from there through line 134 to both the centering limit switch left 132, and the centering limit switch right 131. If the movable frame is off-center to the right, the centering limit switch left 132 is actuated and the current is through 133 to the centering limit switch left 132 along line 135 through the coil of the centering control relay left 120 and along 129 back to the other side of the line. This energizes centering control relay left 120 closing the normally open contact. The frame will now be driven to the left by the series motor as follows: The current will flow from one side of the line 110 through line 111 to the normally closed contact 140 on the centering control relay right 141 which is not energized to the normally open contact 142 on the centering control relay left 120, which is energized through that contact and line 143 to the point previously marked 122 and along wire 123 to the motor 68, and back through 117, as previously described. This will tilt the frame back towards the normal position until the centering limit switch left 132 is no longer actuated.

If, when there is no material on the machine, the frame is tilted to the left, the centering limit switch right 131 will be actuated causing the series motor 68 to turn in a direction to bring the frame back to its normal center position. The current path in this case is as follow: From one side of the line 110 through the normally closed contact on the centering microswitch 90 to 130, along lines 133 and 134 to the centering limit switch right 131, through that switch to wire 145 and along that wire through the coil of the centering control relay right 141 to the other side of the line. This energized centering control relay right closing the open contact and opening the closed contact. The current to the motor in this case is as follows: From one side of the line 110 through line 111, through the normally closed contact 146 on the centering control relay left 120 (which is not energized) to the normally open contact 147 on the centering control relay right 141, (which is energized), through that contact along lines 148 and 116 to motor 68 and back along 117 to the other side of the line.

The circuits are provided with normally closed contacts so that cross-operations which would burn out the motor are not possible. This is brought about by arranging the normally closed contacts in such a way that if both the left and right relays should be energized or operated simultaneously, the current to the motor is completely opened and no current can flow.

The present invention thus provides a device which easily, positively and automatically centers an off-centered web so as to deliver the latter in a centered relation to a subsequent operation. During this centering operation, no unequal tensions are applied to either of the web edges. In addition, no wrinkles or abrasions are imparted to the web during the centering operation. The drift detector pad 75 is located at the closest practical point on the lateral edge of the web preceding the leaving roller 31 of the tiltable frame. Such an arrangement permits fine increments of control (.010″), and the detection of the side drift and the complete correction for drift occur at substantially the same location on the web.

While certain embodiments of the invention have been disclosed, it is to be understood that the inventive idea may be carried out in a number of ways. This application is, therefore, not to be limited to the precise details described, but is intended to cover all variations and modifica-

What I claim is:

1. A web handling apparatus for centering a moving web, comprising in combination a planar frame member over which the web moves, web guides on said frame member, means cooperating with said rollers for directing said web to and from said frame in parallel planes and normal to said frame, means for mounting said frame for pivoting movement, means cooperating with said frame for maintaining the center line of the web directed to said frame in a single plane normal to said frame, means for adjusting said frame in a plane normal to said single plane, and means responsive to the off-center relation of the web directed toward said frame member to control said adjusting means to position the frame member so as to deliver the web therefrom in a centered relation to said apparatus.

2. A web handling apparatus for centering a moving web, comprising in combination a frame member, aligned web guides carried by said frame member and over which said web moves, means cooperating with said guides for directing said web to and from said frame member in parallel planes normal to the plane of said guides, said frame being movable in a single plane, means for adjusting the planar position of said frame member, means responsive to the off-center relation of the web directed toward said frame member to control said adjusting means to position the frame member in accordance with said off-center relation, and means cooperating with said frame to adjust the latter in its plane for maintaining the center line of the incoming web in a single plane.

3. A web handling apparatus for centering a moving web, comprising in combination a frame member, aligned web guides carried by said frame member and over which said web moves, means cooperating with said guides for directing said web to and from said guides in parallel planes normal to a plane passing through said guides, a pivot for said frame member to permit movement thereof in a single plane, means for adjusting the planar position of said frame member about said pivot, means responsive to the off-center relation of the web moving over said frame member to control said adjusting means to position said frame member to discharge the web therefrom in a centered relation, and means for positioning the pivot in accordance with the adjustment of said frame member to maintain the center line of the web directed to said frame member in a single plane normal to the plane of said guides.

4. A web handling apparatus for centering a moving web, comprising in combination a frame member, aligned web guides carried by said frame member and over which said web moves, means cooperating with said guides for directing said web to and from said guides in parallel planes normal to a plane passing through said guides, a pivot for said frame member, means cooperating with said pivot for maintaining said frame member in a plane, means for adjusting the planar position of said frame member about said pivot, means responsive to the off-center relation of the web moving over said frame member to control said adjusting means to pivot said frame member to position the latter to discharge the web therefrom in a centered relation, and means controlled by the pivoting of said frame to adjust said pivot to maintain the center line of the web fed to said frame member in the same plane for all positions of the frame member.

5. A web handling apparatus for centering a moving web, comprising in combination a frame member, aligned web guides carried by said frame member and over which said web moves, means cooperating with said guides for directing said web to and from said guides in parallel planes normal to a plane passing through said guides, means for pivoting said frame member about a point on one side of said member, means connected to said frame member in alignment with said pivot to move the frame member about said pivot to vary the angular relation thereof, means cooperating with said pivot to maintain said guides in a single plane while moving about said pivot, means responsive to the off-center relation of the web being delivered to said frame member to control said moving means to adjust the angular position of the frame member in accordance with the off-centering of the web to deliver the web in a centered relation from said frame member, and means for adjusting the position of said pivot to maintain the center line of the web coming to said frame member always in the same plane.

6. A web handling apparatus for centering a moving web, comprising in combination a frame member, aligned web guides carried by said frame member and over which said web moves, means cooperating with said guides for directing said web to and from said guides in parallel planes normal to a plane passing through said guides, means for pivoting said frame member about a point on one side of said member, means connected to said frame member in alignment with said pivot to move the frame member about said pivot to vary the angular relation thereof, means cooperating with said pivot to maintain said guides in a single plane while moving about said pivot, means responsive to the off-center relation of the web being delivered to said frame member to control said moving means to adjust the angular position of the frame member in accordance with the off-centering of the web to deliver the web in a centered relation from said frame member, and means positioned adjacent said frame moving means to move said frame member to adjust the position of said pivot in accordance with the angular movement of said frame member to maintain the center line of the web directed toward said guides always in the same plane normal to the plane of the guides.

7. A web handling apparatus for centering a moving web, comprising in combination a rectangular frame member, aligned web guides carried by said frame member over which said web moves, fixed guides independent of said frame member and in substantial alignment with said first guides and cooperating therewith to direct the web to and from said first guides in parallel planes normal to a plane passing through said guide, a pivot for said frame connected to the center of one side thereof, means connected to the opposite side of said frame member and in alignment with said pivot for tilting said frame member about said pivot, means cooperating with said pivot for maintaining said first guides in a single plane when said frame member is tilted about said pivot, means responsive to the off-center relation of said web being fed to said frame member for controlling said tilting means in accordance with the amount and direction of said off-centering to position said first guides so as to deliver the web from said frame in a centered relation to said appartaus, and means positioned adjacent said tilting means and in alignment with said pivot for varying the position of the latter in accordance with the tilting of said frame member to maintain the center line of the web directed to said frame member in a single plane and normal to the plane passing through said first guides.

8. A web handling apparatus for centering a moving web, the combination with a support, of a rectangular frame member, aligned web guides carried by said frame member and over which said web moves, a pair of aligned guides independent of said first guides and cooperating therewith to direct said web to and from said frame member in parallel planes normal to a plane passing through said first guides, a pivot connected to one side of said frame member at the center thereof, frame tilting means connected to the other side of said frame member in alignment with said pivot to tilt the frame member about said pivot relative to said support, means on said other side engaging said support and cooperating with said pivot to maintain said first guides in a single plane upon tilting of said frame member about said pivot, means associated with said frame member and engaging an edge of said web and movable in response to the off-center relation of said web passing over said frame, means operatively connecting said edge engaging means to said tilting means to tilt said frame member in accordance with the direction and amount of off-centering of said web so as to re-center said web relative to said support, and means positioned adjacent said tilting means and in alignment with said pivot for moving said frame member as a whole to shift the planar position of said pivot to maintain the cetner line of the web being directed to said frame member in a single plane and normal to the plane passing through said first guides.

9. A web handling apparatus for centering a moving web, comprising in combination a rigid frame member, aligned guides carried by said frame member and over which said web moves, means for pivoting said member about a side thereof, drive means, means on another side of said member and in alignment with said pivot and connected to said drive means to tilt said frame in a plane about said pivot, means cooperating with said pivot to maintain said frame member in a plane, means cooperating with said guides for directing the web to and from said frame member in parallel planes and normal to the plane of said guides, means engaging an edge of said web and movable in response to the off-center relation thereof to said frame, means for connecting said edge engaging means to said drive means when said web is off center to tilt said web to restore the latter to a centered relation, and means associated with said tilting means to move said frames and pivot as a unit in a plane and in a direction normal to the tilting movement to maintain the center line of the web moving to said frame in a single plane for all tilted positions of said frame member.

10. A web handling apparatus for centering a moving web, the combination with a support, of a vertically arranged rectangular rigid frame member, a pair of vertically aligned rollers carried by said frame member over which said web moves, a pair of fixed vertically aligned rollers independent of said frame member and arranged in a vertical plane parallel to the vertical plane of said first rollers, said second rollers being in substantial horizontal alignment with said first roller to direct said web to and from said first roller in parallel planes and normal to the vertical plane of said first rollers, an adjustable pivot for said frame member connected to the midpoint of the bottom side thereof, drive means, means for connecting said drive means to the midpoint of the top side of said frame member and in alignment with said pivot, means engaging the edge of said web and movable laterally therewith when the web is off-centered, means for connecting said edge engaging means with said drive means to tilt said frame member in a plane about said pivot in accordance with the off-centering of said web relative to said frame member so as to adjust the angular relation of the frame member to re-center the web relative to said apparatus, means carried by said other side and cooperating with said pivot to maintain said first rollers in a single plane when said frame member is tilted about said pivot, a roller carried by said frame in vertical alignment with said pivot, and a cam carried by said other side resting on said roller to support said frame thereon and to shift said frame member vertically in a plane upon said tilting to adjust the vertical position of said pivot to maintain the center line of the web fed to said frame member in a single plane normal to the plane of said first rollers for all angular positions of said frame members.

11. A web handling apparatus for centering a moving web, comprising in combination a rigid vertically arranged frame member, upper and lower vertically aligned rollers carried by said frame member and over which said web moves, upper and lower vertically aligned rollers independent of said first rollers and positioned in a plane parallel thereto, said second pair of rollers being in substantial horizontal alignment with said first rollers to direct said web to and from said frame member in substantially parallel planes which are normal to a vertical plane through said first rollers, an adjustable pivot connected to the lower side of said frame member at the midpoint thereof, a pin connected to the top side of said frame member in vertical alignment with said pivot, drive means, means to connect said pin to said drive means so that operation of the latter will tilt said frame member to position the latter angularly relative to said web, rollers carried by said frame member and engaging a fixed plate and cooperating with said pivot to main said frame member in a plane for all positions thereof, a feeler pad engaging an edge of said web and movable in response to an off-centering of the web, means to connect said pad to said drive means to operate the latter when the web is off-center to tilt said frame to re-center said web, a fixed roller, and a cam carried by said other side of said frame member and resting on said roller to support said frame member thereon, tilting of said frame member serving to move said cam on said roller to move said frame member vertically to shift said frame member and pivot vertically and in a plane in accordance with the tilt of the frame member to maintain the center line of the web being fed to the lower roller of said frame member in the same plane for all angular positions of said frame member.

12. A web handling apparatus for centering a moving web, comprising in combination an adjustable frame over which said web moves, web guides on said frame, means for directing said web to and from said frame in substantially parallel planes normal to said frame, means for adjusting said frame member, means movable by said web in response to off-centering thereof, means to connect said movable means to said adjusting means to render the latter operative to adjust said frame member in response to the off-centering of the web to recenter the latter, centering means, means controlled by said centering means and rendered operative when no web is moving over said frame to disconnect said movable means from said adjusting means, and means to connect said centering means to said adjusting means to adjust said frame member to return the latter to its centered position.

13. A web handling apparatus for centering a moving web, comprising in combination an adjustable frame over which said web moves, drive means for adjusting said frame, a pair of aligned web guides on said frame, means for directing said web to and from said frame in substantially parallel planes normal to said aligned guides, means connected to said frame member to move the latter, feeler means engaging an edge of said web and laterally movable in response to off-centering of the web as it moves over said frame member, means for connecting said feeler to said drive means to render the latter operative when the web is off-center to adjust said frame to recenter the web as it leaves said frame, and a second feeler engaging the opposite edge of said web and movable to an operative position when the trailing end of the web passes to disconnect said first feeler from said drive means and to connect the second feeler thereto to adjust said frame member to its centered position.

14. A web handling apparatus for centering a moving web, comprising in combination a pivoted frame member over which said web moves, web guides on said frame, guides arranged in alignment with said first guides for directing the web to and from said frame member in parallel planes and normal to said frame, means responsive to the off-center relation of the web fed to said frame member to pivot the latter to deliver said web from said member in a centered relation, means to adjust said frame member in a direction normal to its pivoting movement to maintain the center line of the portion of the web being directed to said frame member in the same plane for all pivoted positions of the frame member, and means rendered operative only when no web is passing over said frame member to pivot the latter to a centered position.

15. A web handling apparatus for centering a moving web, comprising in combination a rigid frame member, aligned web guides carried by said frame member, guide means for directing said web to and from said first guides in parallel planes and normal to a plane passing through said first guide, an adjustable pivot for said frame member, drive means means for connecting said drive means to said frame member to tilt the latter in a plane about said pivot, means engaging said web and operative when the web becomes off-centered relative to said frame, means to connect said engaging means to said drive means to render the drive means operative when the web is off-center to tilt said frame member to re-center said web, means rendered operative when said frame member is tilted to move said frame member as a whole to vary the position of said pivot in accordance with the pivoting of said frame member to maintain the center line of the web approaching said frame member in the same plane irrespective of the degree of tilt of said frame member, and centering means cooperating with said web and rendered operative when the supply of web is exhausted to tilt said frame member to return the latter to its centered position.

16. A web handling apparatus for centering a moving web, comprising in combination a rigid frame member, aligned web guides carried by said frame member, guide means for directing said web to and from said first guides in parallel planes and normal to a plane passing through said first guide, an adjustable pivot for said frame member, drive means, means for connecting said drive means to said frame member to tilt the latter in a plane about said pivot, means engaging said web and operative when the web becomes off-centered relative to said frame, means to connect said engaging means to said drive means to render the drive means operative when the web is off-center to tilt said frame member to recenter said web, means rendered operative when said frame member is tilted to move said frame member as a whole to vary the position of said pivot in accordance with the pivoting of said frame member to maintain the center line of the web approaching said frame member in the same plane irrespective of the degree of tilt of said frame member, centering means cooperating with said web and rendered operative when the supply of web is exhausted to tilt said frame member to return the latter to its centered position, and means for rendering the centering means inoperative when said frame member reaches its center position.

17. A web handling apparatus for centering a moving web, comprising in combination a rigid frame member, aligned web guides carried by said frame member, guide means for directing said web to and from said first guides in parallel planes and normal to a plane passing through said first guide, an adjustable pivot for said frame member, drive means, means for connecting said drive means to said frame member to tilt the latter in a plane about said pivot, means engaging said web and operative when the web becomes off-centered relative to said frame, means to connect said engaging means to said drive means to render the drive means operative when the web is off-center to tilt said frame member to recenter said web, means rendered operative when said frame member is tilted to move said frame member as a whole to vary the position of said pivot in accordance with the pivoting of said frame member to maintain the center line of the web approaching said frame member in the same plane irrespective of the degree of tilt of said frame member, centering means cooperating with said web and rendered operative when the supply of web is exhausted to tilt said frame member to return the latter to its centered position, means for rendering the centering means inoperative when said frame member reaches its center position, and means cooperating with said pivot for maintaining said frame member in a single plane during tilting and centering.

18. A web handling apparatus for centering a moving web, comprising in combination a rigid frame member, aligned web guides carried by said frame member, guide means for directing said web to and from said first guides in parallel planes and normal to a plane passing through said first guide, an adjustable pivot for said frame member, drive means, means for connecting said drive means to said frame member to tilt the latter in a plane about said pivot, a feeler pad engaging one edge of the web as the latter moves over said frame member, said pad being movable laterally in response to any off-center relation of the web, an electrical circuit connecting said pad to said drive means to render the latter operative to tilt said frame member about said pivot in a direct and amount determined by the off-center relative of said web so as to re-center the web as it leaves said frame member, a second feeler pad engaging the opposite edge of said web, an electrical circuit connecting said second pad to said drive means and rendered operative when the web is exhausted to open said first circuit to disconnect said first pad therefrom and simultaneously to close said second circuit to energize said drive means to move said frame member about said pivot to its centered position, and means for opening the second circuit when the frame member reaches its centered position.

LEON P. MOREY.

REFERENCES CITED

The following references are of record in the file of this patent:

UNITED STATES PATENTS

| Number | Name | Date |
|---|---|---|
| 1,186,906 | Hopkins | June 13, 1916 |
| 2,064,993 | Sperry | Dec. 22, 1936 |
| 2,262,638 | Ferm | Nov. 11, 1941 |
| 2,303,533 | Ferm | Dec. 1, 1942 |
| 2,331,030 | King | Oct. 5, 1943 |
| 2,366,331 | Harless | Jan. 2, 1945 |
| 2,461,084 | Robertson | Feb. 8, 1949 |